(12) United States Patent
Sörner (10) Patent No.: US 10,963,048 B2
(45) Date of Patent: Mar. 30, 2021

(54) METHOD AND A SYSTEM FOR VISUAL HUMAN-MACHINE INTERACTION

(71) Applicant: Smart Eye AB, Gothenburg (SE)

(72) Inventor: Per Sörner, Gothenburg (SE)

(73) Assignee: SMART EYE AB, Gothenburg (SE)

( * ) Notice: Subject to any disclaimer, the term of this patent is extended or adjusted under 35 U.S.C. 154(b) by 0 days.

(21) Appl. No.: 16/958,577

(22) PCT Filed: Feb. 5, 2019

(86) PCT No.: PCT/EP2019/052728
§ 371 (c)(1),
(2) Date: Jun. 26, 2020

(87) PCT Pub. No.: WO2019/154789
PCT Pub. Date: Aug. 15, 2019

(65) Prior Publication Data
US 2020/0379558 A1 Dec. 3, 2020

(30) Foreign Application Priority Data
Feb. 6, 2018 (EP) ...................................... 18155213

(51) Int. Cl.
*G06F 3/01* (2006.01)
(52) U.S. Cl.
CPC .................................... *G06F 3/013* (2013.01)
(58) Field of Classification Search
CPC ....................................................... G06F 3/013
See application file for complete search history.

(56) References Cited

U.S. PATENT DOCUMENTS

| 2014/0354539 A1 | 12/2014 | Skogo et al. |
| 2014/0368442 A1 | 12/2014 | Vahtola |
| 2015/0177833 A1* | 6/2015 | Vennstrom .......... G06F 3/04842 345/156 |

(Continued)

OTHER PUBLICATIONS

International Search Report and Written Opinion for PCT Application No. PCT/EP2019052728 which is the parent application to the instant application, dated Mar. 21, 2019 11 pages.

(Continued)

*Primary Examiner* — Kent W Chang
*Assistant Examiner* — Chayce R Bibbee
(74) *Attorney, Agent, or Firm* — Harness, Dickey & Pierce, P.L.C.; Anthony G. Fussner (57) ABSTRACT

A method for visual interaction between a user (10) and a machine (20) using gaze estimation is disclosed. The method comprises: displaying an initial element and one or more further elements on a display (30), each further element being spatially separated from the initial element, whereby each further element defines an angular range with respect to the position of the initial element; determining that a direction from a first gaze point to a second gaze point lies within the angular range defined by a further element selected by the user; and sending instructions to the machine to perform a function associated with the selected element. A system (1) for visual interaction between a user (10) and a machine (20) using gaze estimation is also disclosed. The gaze points of the user may be determined with relatively low precision.

14 Claims, 6 Drawing Sheets

(56) References Cited

U.S. PATENT DOCUMENTS

2016/0195924 A1    7/2016   Weber et al.
2017/0357314 A1    12/2017  Elvesjo et al.

OTHER PUBLICATIONS

Extended European Search Report for EP Application No. 18155213.4, which is the parent application to the instant application; dated Mar. 19, 2018. 8 pages.
Gazing with pEYEs: A. Huckauf, et al., https://www.researchgate.net/publication/220811076, Jan. 2008, 5 pages.

* cited by examiner

Fig. 4 ated step may comprise displaying one or more arrows, each pointing to a further element of the one or more further elements.

METHOD AND A SYSTEM FOR VISUAL HUMAN-MACHINE INTERACTION

This patent application is a U.S. national stage filing under 35 U.S.C. § 371 of PCT International Application No. PCT/EP2019/052728 filed Feb. 5, 2019 (published as WO2019/154789 on Aug. 15, 2019), which claims priority to and the benefit of European Application No. 18155213.4 filed Feb. 6, 2018. The entire contents of these applications are incorporated herein by reference.

TECHNICAL FIELD

The present invention relates to a method and a system for visual interaction between a user and a machine.

BACKGROUND OF THE INVENTION

Eye tracking techniques enable human-machine interaction through eye gaze. These techniques may for example be used for inputting text into a computer. In such applications, a user usually "types" by first selecting a letter by gazing at an icon of the letter shown on a screen. The gazed-upon icon is highlighted, and the user finally confirms the selection by for example blinking or letting his or her gaze dwell briefly on the highlighted icon. A discussion of gaze-controlled text input can be found in the paper "Gazing with pEYEs: towards a universal input for various applications" (by A. Huckauf and M. H. Urbina and published in "Proceedings of the 2008 symposium on Eye tracking research & applications", ETRA '08, pages 51-54, ACM, New York, N.Y., USA).

Text input and other applications where a user interacts with a graphical interface shown on a display through eye gaze typically require the gaze direction to be determined with high precision. High precision usually requires accurate calibration of the eye tracking system with respect to eye parameters and glint parameters, something which drives cost due to requirements on illumination for glint generation and camera resolution. In addition, the calibration procedure normally involves a series of measurements in which the user must look carefully at a sequence of different targets. The procedure is time-consuming and perceived as complicated by many users.

A system which reduces the need for accurate calibration is disclosed in US 2014/0354539. As disclosed therein, a user selects an input operation to an operating system by following a moving graphical control on a screen with his or her gaze. The input operation associated with a particular graphical control is selected if the movement of the gaze matches the movement of the graphical control. Although the need for accurate calibration is reduced in the system disclosed in US 2014/0354539, the system is rather complicated, for example because of the requirement of several interaction modes (unidirectional and bidirectional). Moreover, some users may find it difficult or inconvenient to follow the moving graphical controls with their gaze, and the process of selecting an operation is also rather slow.

SUMMARY OF THE INVENTION

In view of the foregoing, there is a perceived need for an improved or alternative method for visual human-machine interaction.

To address this need, there is presented, according to a first aspect of the invention, a method for visual interaction between a user and a machine using gaze estimation, wherein the method comprises activating an interaction mode, and wherein the interaction mode comprises the steps of: displaying an initial element on a display, the initial element having a fixed position; estimating a first gaze point of the user; assuming that the user is gazing at the initial element; displaying one or more further elements on the display, each further element being associated with one or more functions of the machine and having a fixed position spatially separated from the position of the initial element, whereby each further element defines an angular range with respect to the position of the initial element; estimating a second gaze point of the user; determining that a direction from the first gaze point to the second gaze point lies within the angular range defined by a selected further element of the one or more further elements; and sending instructions to the machine to perform at least one of the one or more functions associated with the selected element.

Current eye tracking systems are usually capable of determining relative directions with good accuracy even with no, or only approximate, initial calibration because of error cancellations. The invention is based on the realization that it is not necessary to use moving graphical user interface elements to exploit this property. In the present invention, the graphical user interface elements do not move on the screen as in the system disclosed in US 2014/0354539. Instead, the user selects a function via the movement of his or her gaze relative to one of the graphical user interface elements (i.e. the "initial element"). The result is a method for visual human-machine interaction which is simple to implement and which enable fast interaction with a small risk of user selection errors because of its ease of use.

Moreover, since no or only low-precision calibration of the eye tracking system is required, the requirements on, for example, camera resolution and glint generation are relatively low, something which helps to reduce costs. As an example, calibration with respect to glint parameters and/or visual axes parameters is usually not required.

The activating step may comprise at least one of the steps: determining that a gaze point of the user is within a predetermined distance from a predetermined area; determining that a gaze point of the user is moving towards a predetermined area; determining that a gaze point of the user is fixed at a predetermined area for a predetermined amount of time; detecting a gesture; detecting a sound; and receiving a command from a manual input device. The predetermined area may for example be the viewing area of the display. The manual input device may for example be a button, a knob or a stick.

The method may comprise, before the sending step, a step of visually indicating the selected further element. The purpose of the visually indicating step is to inform the user of which further element he or she has selected. Thereby, the risk that a function other than the one intended by the user is performed is reduced.

The visually indicating step may for example comprise highlighting the selected further element. Highlighting the selected further element may for example include at least one of: changing the colour, shape or size of the selected further element; making the selected further element brighter or darker; making the selected further element fade; and removing the non-selected further elements from the display. Further, the visually indicating step may comprise replacing the selected further element with one or more different graphical user interface element. For example, the selected further element may be replaced by a graphical user element representing a menu allowing the user to choose between different options. Still further, the visually indicating step may comprise moving the selected further element on the display. In such case, the selected further element may move on the screen while the operation of the machine changes in some way, the movement of the selected further element thereby being a visual representation of the change in operation. For example, the selected further element may move on the screen while the volume of a car radio or the temperature inside a car is being adjusted.

The method may comprise, before the sending step, a step of receiving a confirmation from the user to perform the at least one of the one or more functions associated with the selected further element. The purpose of the receiving step is to allow the user to send a confirmation that the selected function is the one he or she intended to select. Thereby, the risk that a function other than the one intended by the user is performed is reduced. The receiving step may comprise at least one of the steps: determining that the gaze of the user is fixed at the second gaze point for a predetermined amount of time; detecting an eye blink of the user; detecting a gesture; detecting a sound; and receiving a command from a manual input device.

The method may comprise calibrating an eye tracker based on the position of the initial element and the first gaze point. The position of the first gaze point and the position of the initial element may be different, and the position information can be used to calibrate an eye tracker so as to increase its accuracy.

According to a second aspect of the invention, there is presented a system for visual interaction between a user and a machine using gaze estimation, comprising: a graphics module configured to display an initial element and at least one further element on a display, the initial element having a fixed position, each further element being associated with one or more functions of the machine and having a fixed position spatially separated from the position of the initial element, whereby each further element defines an angular range with respect to the position of the initial element; an eye tracker configured to estimate a first gaze point and a second gaze point of the user; and processing circuitry connected to the graphics module and the eye tracker, the processing circuitry being configured to determine that a direction from the first gaze point to the second gaze point lies within the angular range defined by a selected further element of the one or more further elements, and send a signal instructing the machine to perform at least one of the one or more functions associated with the selected element.

The effects and features of the second aspect of the invention are substantially analogous to those of the first aspect of the invention described above.

The graphics module may be configured to visually indicate the selected further element to the user. For example, the graphics module may be configured to highlight the selected further element. As another example, the graphics module may be configured to move the selected further element on the display.

The processing circuitry may be configured to receive a confirmation from the user to perform the at least one of the one or more functions associated with the selected further element.

The eye tracker may be configured for calibration based on the position of the initial element and the first gaze point.

BRIEF DESCRIPTION OF THE DRAWINGS

The invention will be described in more detail with reference to the appended drawings, in which.

Like reference numerals refer to like elements throughout.

DETAILED DESCRIPTION OF EMBODIMENTS OF THE INVENTION

Figure 1:
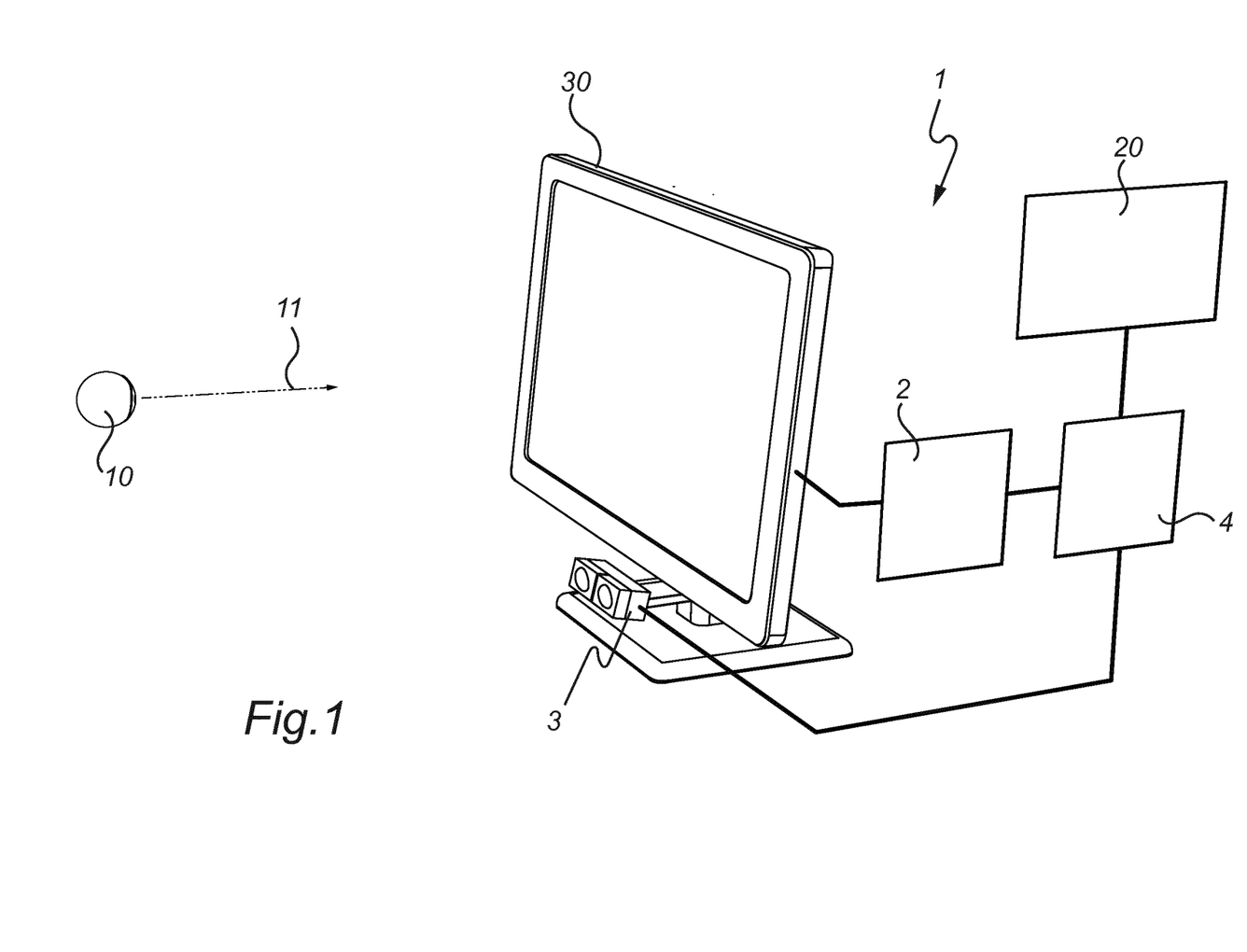
FIG. 1 shows a schematic view of a system for visual interaction between a user and a machine using gaze estimation according to an embodiment of the invention.

FIG. 1 shows a perspective view of a system 1 for visual interaction between a user 10, schematically represented by an eye, and a machine 20 using gaze estimation. The user 10 may select a function of the machine 20 via the display 30 using his or her gaze. The display 30 is here a flat panel display, specifically one using light-emitting diodes, but the system 1 may be used with other types of displays. The machine 20 may for example be a piece of equipment integrated with a vehicle. Examples of such pieces of equipment include car radios and car climate control systems. In such case, the function of the machine 20 may for example be to change the radio frequency or to switch the heat on or off. As another example, the machine 20 may be a computer, such as a desktop computer or a tablet computer. In such case, the function of the machine 20 may for example be to execute a piece of software stored on the computer or to type letters using a virtual keyboard shown on the display 30. As yet another example, the machine 20 may be a device in a computer network and may be configured to execute procedures remotely on other devices in the network, for example via a Remote Procedure Call. Hence, it should be clear that the terms "machine" and "function", as used herein, are meant to be interpreted broadly.

As illustrated in FIG. 1, the system 1 comprises a graphics module 2 configured to display a graphical user interface on the display 30. The connection between the graphics module 1 and the display 30 is in this case a wired connection, but may be a wireless connection in a different example.

The system 1 further comprises an eye tracker 3. The eye tracker 3 is in this case of a conventional type and located below the display 30. However, the eye tracker 3 may have a different position in a different example. The eye tracker 3 is configured to estimate where the user 10 is gazing.

The system 1 comprises processing circuitry 4 connected to the graphics module 2, the eye tracker 3 and the machine 20. The processing circuitry 4 is in this case connected to these components via wired connections. However, it is conceivable to use wireless connections instead of wired connections. The processing circuitry 4 is configured to control the graphics module 2 and to receive data regarding the position of the gaze 11 of the user 10 from the eye tracker 2. Further, when the user 10 moves his or her gaze 11, the processing circuitry 4 is here configured to use the position information to determine the direction in which the gaze 11 moves. The processing circuitry 4 is also configured to send instructions to the machine 20.

It is noted that, even though the graphics module 2, the eye tracker 3 and the processing circuitry 4 are illustrated as separate components in FIG. 1, this may or may not be the case in a different example. For example, the graphics module 2 may be integrated with the processing circuitry 4. As another example, the graphics module 2 and the processing circuitry 4 may be integrated with the eye tracker 3. Thus, some, or all, of these components may form part of a single unit in a different example.

Figure 2A:
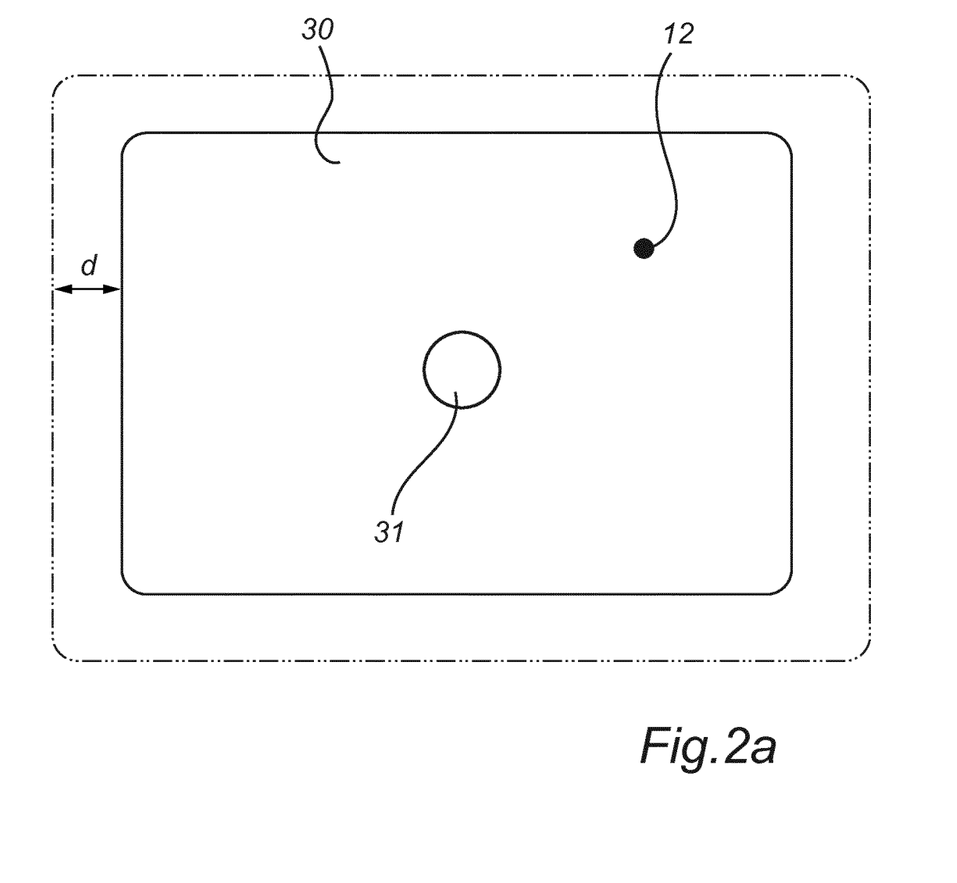
FIGS. 2a, 2b, 2c, 2d and 2e show schematic views of a part of the system in FIG. 1 during use thereof.

In use, the system 1 operates as described in the following with reference to FIGS. 2a, 2b, 2c, 2d, 2e and 3, and with continued reference to FIG. 1. FIG. 2a shows a front view of the display 30 at an earlier point in time than FIGS. 2b, 2c, 2d and 2e, which show perspective views of the display 30.

Figure 3:
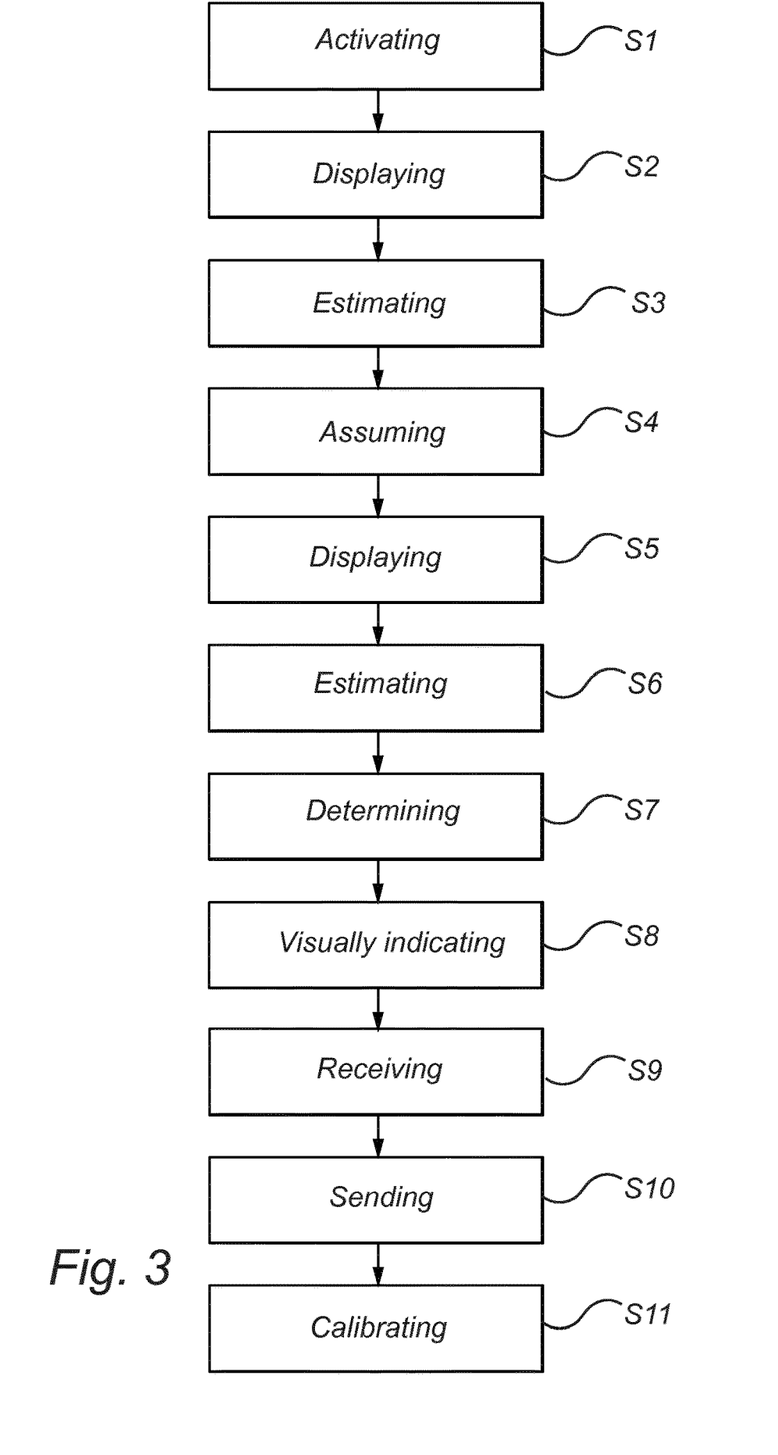
FIG. 3 shows a flowchart of a method for visual interaction between a user and a machine using gaze estimation according to an embodiment of the invention.

In a step S1, an interaction mode of the system 1 is activated. The user 10 can interact visually with the system 1 when the interaction mode is activated. In this case the system 1 enters the interaction mode when the eye tracker 3 estimates that the user's 11 gaze is located at a predetermined distance d from the display 30 (see FIG. 2a). Thus, the interaction mode is here automatically activated. It is noted that there are other ways in which the interaction mode can be activated. For example, the system 1 may be configured to enter the interaction mode when the gaze 11 of the user 10 is estimated to be moving towards the display 30 or to be located at, or moving towards, a predetermined distance from an area or a point on the display 30. Further, the system 1 may be configured such that the user 10 can activate the interaction mode manually, for example by making a sound or a gesture. Alternatively, or in addition, the system 1 may include a manual input device allowing the user 10 to send a command to the system 1 so that the system 1 switches to the interaction mode. Such a manual input device may for example be a knob or button on a computer mouse or on a control panel inside a car.

The system 1 may be configured such that the system 1 leaves the interaction mode when the user 10 moves the gaze 11 away from the display 30. In such case, the user 10 may cancel the selection process at any time by moving the gaze away from the display 30. The system 1 may be adapted to, for example, turn the display 30 dark if the user 10 cancels the selection process. In a step S2, after the interaction mode has been activated, the graphics module 2 displays an initial element 31 on the display 30 (see FIG. 2a). The initial element 31 is here a graphical user interface element. The initial element 31 has a fixed position on the display 30, so the initial element 31 does not move on the display 30. In this case, the initial element 31 has a circular shape and is located at the centre of the display 30. Of course, the initial element 31 can in general have any position and shape deemed suitable.

Figure 2B:
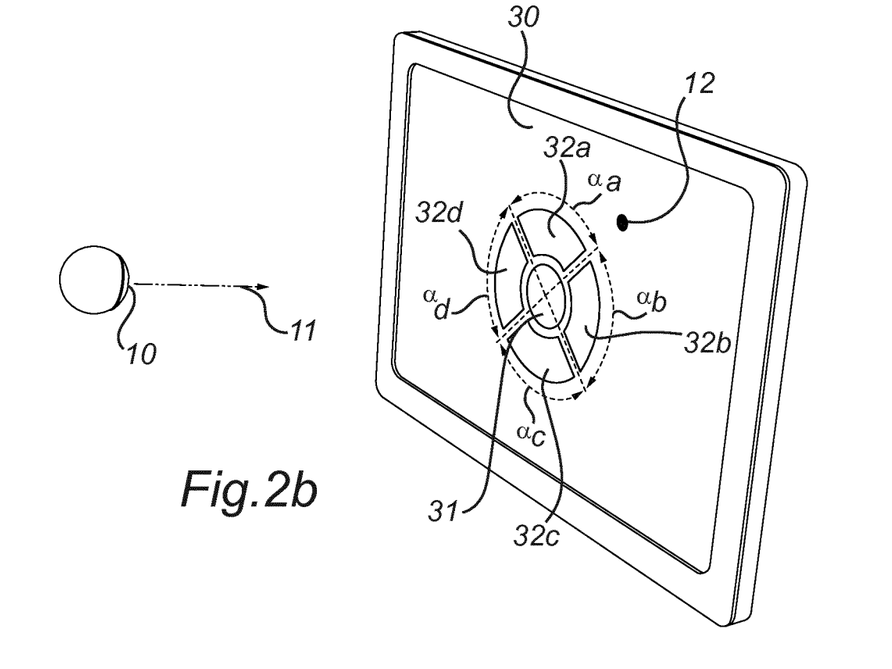

In a step S3, the eye tracker 3 estimates a first gaze point 12 of the user 10 (see FIG. 2b). The eye tracker 3 generally tracks the gaze 11 of the user 10 continuously, and may estimate the first gaze point 12 as a point of gaze which is constant for more than a required period of time, indicating that the user 10 has rested his/her gaze on the initial element 31. The processing circuitry 4 may wait a predetermined amount of time after the initial element 31 is first shown on the display 30 for the eye tracker 3 to provide the first gaze point 12. If no gaze point is obtained within the predetermined time (i.e. the eye tracker 3 cannot determine that the user 10 has focused his/her gaze), or if the processing circuitry 4 receives a gaze point which is not in the vicinity of the initial element 31, the processing circuitry 4 may instruct the graphics module 2 to remove the initial element from the display 30, and processing returns to step S1.

Depending on the calibration of the eye tracker 3, the estimated first gaze point 12 may or may not correspond to the location of the initial element 31. As can be seen in FIG. 2b, the first gaze point 12 is in this case not located on the initial element 31. In other words, the user 10 is looking at the initial element 31, but the estimated gaze point is slightly offset due to imperfect calibration of the eye tracker 3.

It is noted that the eye tracker 3 may be adapted to estimate the first gaze point 12 by first estimating two gaze points, one for each eye of the user 10, and then determining the first gaze point 12 based on those two gaze points, for example by taking an average thereof. This way of determining the gaze of the user 10 makes the system 1 relatively robust against, for example, events that might cause the eye tracker 3 to temporarily lose track of one of the eyes of the user 10, such as eye blinks.

In a step S4, the processing circuitry 4 assumes that the user 10 is gazing at the initial element 31. The processing circuitry 4 typically makes this assumption immediately after the first gaze point 12 has been estimated, so that there is no time for the user 10 to move his or her gaze 11.

In a step S5, which is subsequent to the step S4 described above, the graphics module 2 displays one or more further elements 32a, 32b, 32c, 32d on the display 30 (see FIG. 2b). In this case there are four further elements 32a, 32b, 32c, 32d displayed on the display 30, but in general the number of further elements 32a, 32b, 32c, 32d may be greater or smaller than four. Each one of the further elements 32a, 32b, 32c, 32d is a graphical user interface element and associated with a function of the machine 20. The further elements 32a, 32b, 32c, 32d have respective fixed positions on the display 30. Thus, the further elements 32a, 32b, 32c, 32d do not move on the display 30. The positions of the further elements 32a, 32b, 32c, 32d are spatially separated from the position of the initial element 31. In the illustrated example, the four further elements 32a, 32b, 32c, 32d are located generally above, below, to the right of, and to the left of, respectively, the initial element 31. The further element 32a, 32b, 32c, 32d may of course have other locations relative to the initial element 31 in a different example. The initial element 31 here does not overlap with any of the further elements 32a, 32b, 32c, 32d, but this may or may not be the case in a different example. The further elements 32a, 32b, 32c, 32d are in this case wedge-shaped and arranged so as to form a pie menu. However, the further elements 32a, 32b, 32c, 32d are not limited to any particular shape or configuration. Thus, the further elements 32a, 32b, 32c, 32d can for example be circular or rectangular, and do not have to form a pie menu.

The further elements 32a, 32b, 32c, 32d define respective angular ranges $\alpha_a$, $\alpha_b$, $\alpha_c$, $\alpha_d$ relative to the initial element 31. As is illustrated in FIG. 2b, the angular range $\alpha_a$, for example, may in this case be seen as corresponding to a sector of a circle, the circle being centred on the initial element 31 and the sector covering the further element 32a. In this case the angular ranges $\alpha_a$, $\alpha_b$, $\alpha_c$, $\alpha_d$ add up to a full circle, although this may or may not be the case in a different example.

As can also be seen in FIG. 2b, each of the angular ranges $\alpha_a$, $\alpha_b$, $\alpha_c$, $\alpha_d$ corresponds in this case to a quarter of a circle. Stated differently, each of the angular ranges $\alpha_a$, $\alpha_b$, $\alpha_c$, $\alpha_d$ has a "width" of 90°. However, in a different example, the angular ranges may have a different width, and all of the angular ranges do not have to have the same width. In general, the widths of the angular ranges depend on, for example, the number of further elements, the sizes of the further elements and the positions of the further elements on the display.

Figure 2C:
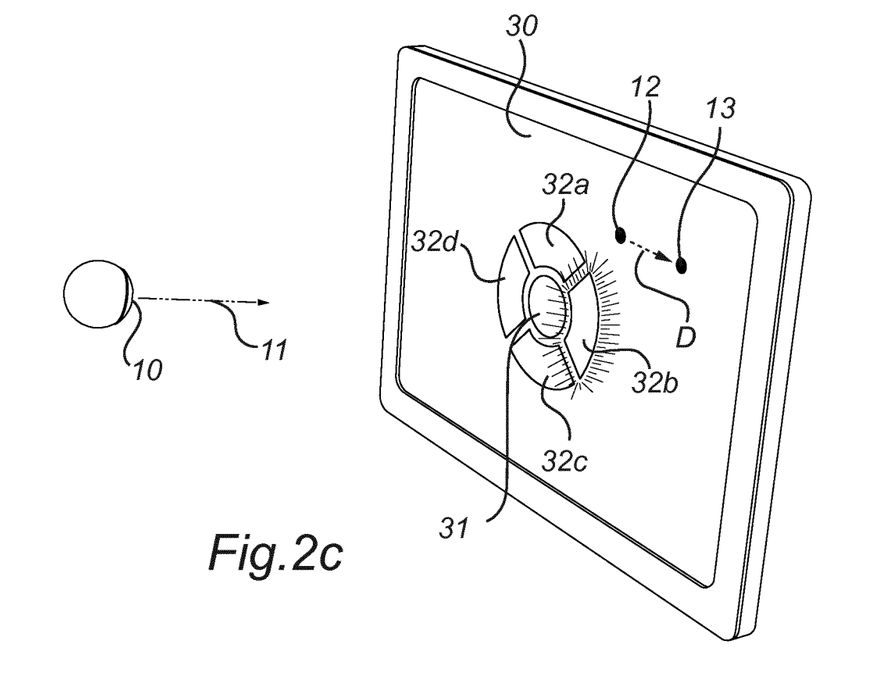

In a step S6, the eye tracker 3 estimates that the gaze 11 is directed at a second gaze point 13 (see FIG. 2c). Specifically, the user 10 may select one of the further elements 32a, 32b, 32c, 32d by moving the gaze 11. In the example illustrated in FIG. 2c, the user 10 moves the gaze 11 to the right in order to select the further element 32b that is located to the right of the initial element 31. Upon detecting that the gaze 11 of the user 10 has moved, the eye tracker 3 estimates that the gaze 11 is directed at the second gaze point 13. In general, the second gaze point 13 may or may not be located on the further element the user 10 intends to select. As can be seen in FIG. 2c, the second gaze point 13 is in this case not located on the further element 32b located to the right of the initial element 31.

It is noted that the eye tracker 3 may be adapted to utilize the gazes of both eyes of the user 10 when estimating the second gaze point 13 (see also the discussion above in connection with step S3).

In a step S7, the processing circuitry 4 determines the direction D that goes from the first gaze point 12 to the second gaze point 13. The direction D is in this case straight to the right. The direction D may be determined in several different ways. The direction D may for example be determined by finding the direction angle of the vector going from the first gaze point 12 to the second gaze point 13. As another example, the direction D may be determined by finding the vector going from the first gaze point 12 to the second gaze point 13, which includes determining the direction angle and the length of the vector.

The processing circuitry 4 compares the determined direction D with the angular ranges $\alpha_a$, $\alpha_b$, $\alpha_c$, $\alpha_d$ defined by the further elements 32a, 32b, 32c, 32d. In this case, the determined direction D lies within the angular range $\alpha_b$ defined by the further element 32b, and, accordingly, the processing circuitry 4 determines that the user 10 has selected the further element 32b. Thus, the choice of the user 10 is determined by a relative gaze movement rather than an absolute gaze direction.

It is noted that the processing circuitry 4 determines that the further element 32b, say, has been selected as long as the direction D is within the angular range $\alpha_b$. So, in this case, the user 10 does not have to move the gaze 11 straight to the right in order to select the further element 32b, but could move the gaze 11 in a direction pointing rightward and slightly upward or downward.

Further, it is noted that there may, in a different example, be directions which do not correspond to a further element because, for example, the angular ranges defined by the further elements do not add up to a full circle. In such case, if the direction D is determined not to lie within one of the angular ranges, the system 1 may for example be adapted to simply wait for the user 10 to move the gaze 11 again and/or signal to the user 10 that he or she needs to move the gaze 11 again to make a selection.

Figure 2D:
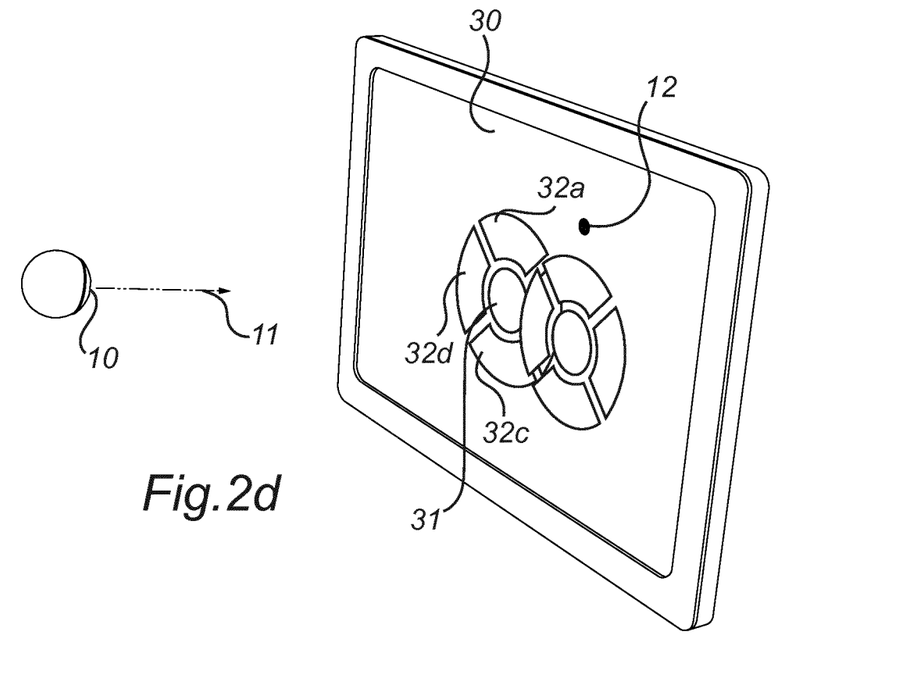
Figure 2E:
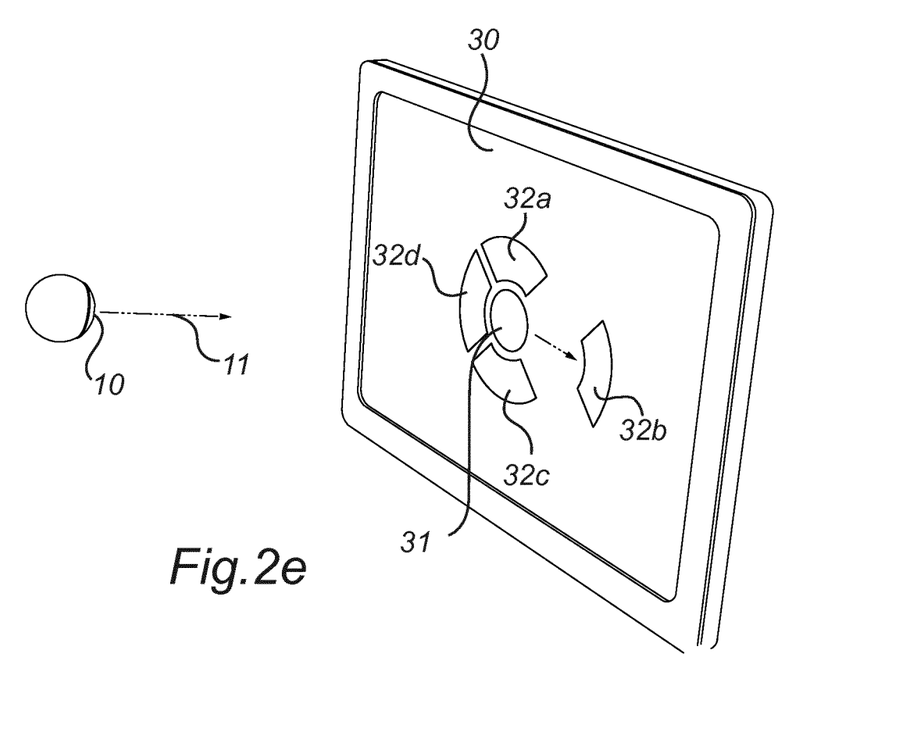

In an optional step S8, the graphics module 2 visually indicates the further element 32b to the right (see FIGS. 2c, 2d and 2e). Thereby, the user 10 sees which further element he or she has selected. In this case, the processing circuitry 4 instructs the graphics module 3 which one of the further elements 32a, 32b, 32c, 32d to visually indicate.

There are several ways in which the graphics module 2 can visually indicate which one of the further elements 32a, 32b, 32c, 32d the user 10 has selected. The selected further element may for example light up (see FIG. 2c). As another example, the graphics module 2 can visually indicate the selected further element by replacing the selected further element with another graphical user element representing a menu which presents new options to the user 10 (see FIG. 2d). Thus, the graphics module 2 may be adapted to present hierarchical menus to the user 10. Using hierarchical menus is one way of associating a further element with several functions of the machine 20. Further, the graphics module 2 can visually indicate the selected further element by, for example, moving the selected further element on the display 30 (see FIG. 2e), spinning the selected further element and/or making the selected further element pulsate.

It is noted that the system 1 may be configured to indicate to the user 10 which further element 32a, 32b, 32c, 32d he or she has selected in a non-visual manner. For example, the system 1 may be capable of giving an audio indication, such as a voice message or a sound signal, via a speaker.

In an optional step S9, the system 1 here receives a confirmation from the user 10 that the visually indicated further element 32b is the one the user 10 intended to select. Several alternatives exist for allowing the user 10 to confirm his or her selection. The system 1 may for example be configured such that the user 10 can confirm the selection by at least one of: blinking an eye; making a gesture; making a sound; and fixing the gaze 11 at the second gaze point 13, or an area around the second gaze point 13, for a predetermined amount of time. Alternatively, or in addition, the system 1 may be configured such that the user may confirm the selection by sending a command to the system 1 using a manual input device, such as a button, a knob or a stick.

It is noted that the system 1 may be configured such that the user 10 can "de-select" a further element which has been visually indicated but which is not the one the user 10 intended to select. For example, the user 10 may be able to de-select a visually indicated further element by moving the gaze 11 away from the second gaze point 13. Alternatively, or in addition, the system 1 may be configured such that the user may de-select a visually indicated further element by sending a command to the system 1 using a manual input device, such as a button, a knob or a stick.

In a step S10, after having received the confirmation from the user 10, the processing circuitry 4 sends a signal instructing the machine 20 to perform the function associated with the selected further element 32b. The machine 20 then performs the function that the user 10 has selected.

In an optional step S11, the eye tracker 3 is here calibrated based on the position of the initial element 31 and the estimated first gaze point 12. For example, the eye tracker 3 may auto-calibrate, i.e. the eye tracker 3 may calibrate itself. It is noted that the calibrating step S11 may occur any time after the estimation of the second gaze point 13 in step S6.

Figure 4:
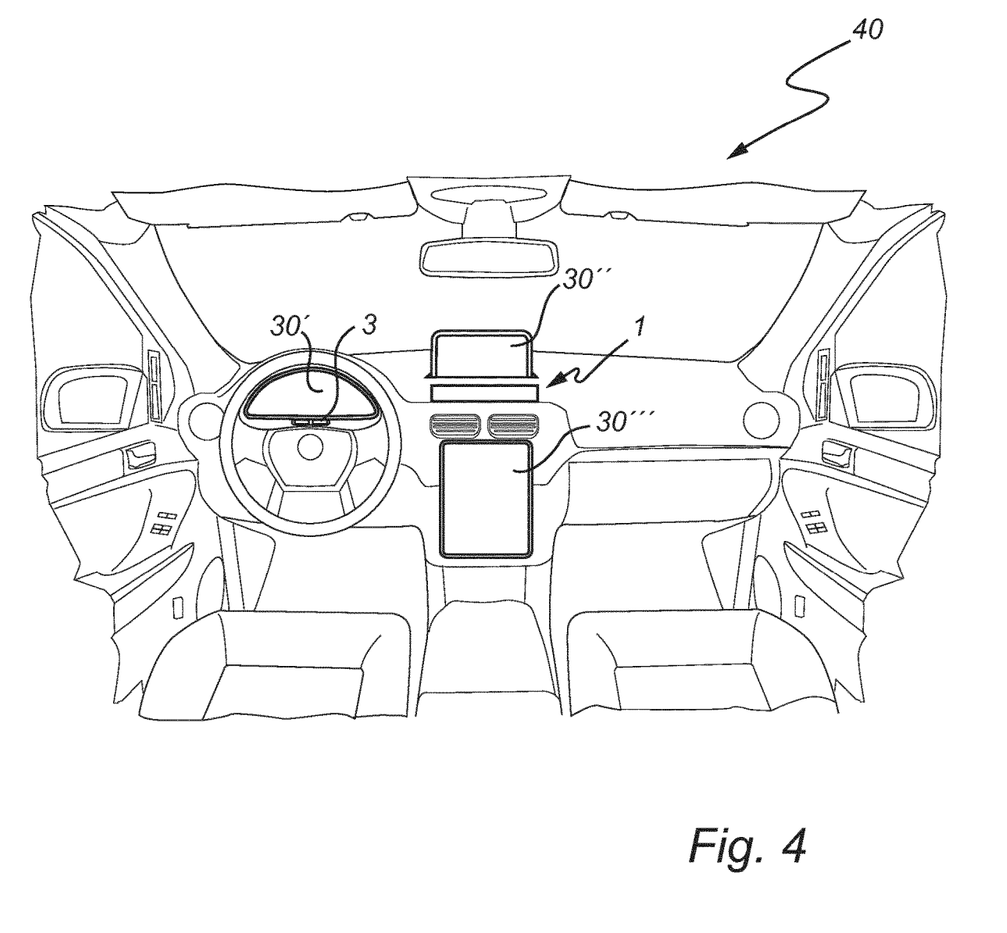
FIG. 4 shows schematically an interior view of a vehicle equipped with a system for visual interaction between a user and a machine using gaze estimation according to an embodiment of the invention.

Turning now to FIG. 4, there is shown an interior view of a vehicle 40 equipped with a system 1 for human-machine interaction using gaze estimation. The system 1 in FIG. 4 is similar to the system described above with respect to FIGS. 1 to 3. The vehicle 40 is in this case a car, although the system 1 may be integrated in other road vehicles, such as trucks, and also in aircrafts and watercrafts, such as airplanes and boats. The car 40 has three displays 30', 30", 30'" which are connected to the system 1. Each display 30', 30", 30'" is associated with one or more machines integrated with the car, such as an audio system, a climate control system, etc. A driver of the car 40 can use his or her gaze to control the machines. In use, the system 1 typically continuously monitors the gaze of the driver using an eye tracker 3. When detecting that the gaze of the driver is directed near one of the displays 30', 30", 30'" for more than a predetermined amount time, the system 1 enters the interaction mode and shows an initial element on that particular display. The driver may then select a function of the machine(s) associated with that particular display in the manner described above with respect to FIGS. 1 to 3.

The person skilled in the art realizes that the present invention by no means is limited to the preferred embodiments described above. On the contrary, many modifications and variations are possible within the scope of the appended claims. For example, some of the steps S1 to S10 can be performed simultaneously, such as the visually indicating step S8 and the sending step S10.

In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for visual interaction between a user and a machine using gaze estimation, wherein the method comprises activating an interaction mode, and wherein the interaction mode comprises the steps of:
    displaying an initial element on a display, the initial element having a fixed position;
    estimating a first gaze point of the user;
    assuming that the user is gazing at the initial element;
    displaying one or more further elements on the display, each further element being associated with one or more functions of the machine and having a fixed position spatially separated from the position of the initial element, whereby each further element defines an angular range with respect to the position of the initial element;
    estimating a second gaze point of the user;
    determining that a direction from the first gaze point to the second gaze point lies within the angular range defined by a selected further element of said one or more further elements; and
    sending instructions to the machine to perform at least one of the one or more functions associated with the selected element.

2. The method according to claim 1, wherein the activating step comprises at least one of the steps: determining that a gaze point of the user is within a predetermined distance from a predetermined area; determining that a gaze point of the user is moving towards a predetermined area; determining that a gaze point of the user is fixed at a predetermined area for a predetermined amount of time; detecting a gesture; detecting a sound; and receiving a command from a manual input device.

3. The method according to claim 1, comprising, before the sending step, a step of visually indicating the selected further element.

4. The method according to claim 3, wherein the visually indicating step comprises highlighting the selected further element.

5. The method according to claim 3, wherein the visually indicating step comprises moving the selected further element on the display.

6. The method according to claim 1, comprising, before the sending step, a step of receiving a confirmation from the user to perform said at least one of the one or more functions associated with the selected further element.

7. The method according to claim 6, wherein the receiving step comprises at least one of the steps: determining that the gaze of the user is fixed at the second gaze point for a predetermined amount of time; detecting an eye blink of the user; detecting a gesture; detecting a sound; and receiving a command from a manual input device.

8. The method according to claim 1, comprising calibrating an eye tracker based on the position of the initial element and the first gaze point.

9. A system for visual interaction between a user and a machine using gaze estimation, comprising:
    a graphics module configured to display an initial element and at least one further element on a display, the initial element having a fixed position, each further element being associated with one or more functions of the machine and having a fixed position spatially separated from the position of the initial element, whereby each further element defines an angular range with respect to the position of the initial element;
    an eye tracker configured to estimate a first gaze point and a second gaze point of the user; and
    processing circuitry connected to the graphics module and the eye tracker, the processing circuitry being configured to
        determine that a direction from the first gaze point to the second gaze point lies within the angular range defined by a selected further element of said one or more further elements, and
        send a signal instructing the machine to perform at least one of the one or more functions associated with the selected element.

10. The system according to claim 9, wherein the graphics module is configured to visually indicate the selected further element to the user.

11. The system according to claim 9, wherein the graphics module is configured to highlight the selected further element.

12. The system according to claim 9, wherein the graphics module is configured to move the selected further element on the display.

13. The system according to claim 9, wherein the processing circuitry is configured to receive a confirmation from the user to perform said at least one of the one or more functions associated with the selected further element.

14. The system according to claim 9 wherein the eye tracker is configured for calibration based on the position of the initial element and the first gaze point.

* * * * *